March 5, 1929.  W. E. WILLIAMS  1,704,524
DEMOUNTABLE RIM WHEEL
Filed March 8, 1921
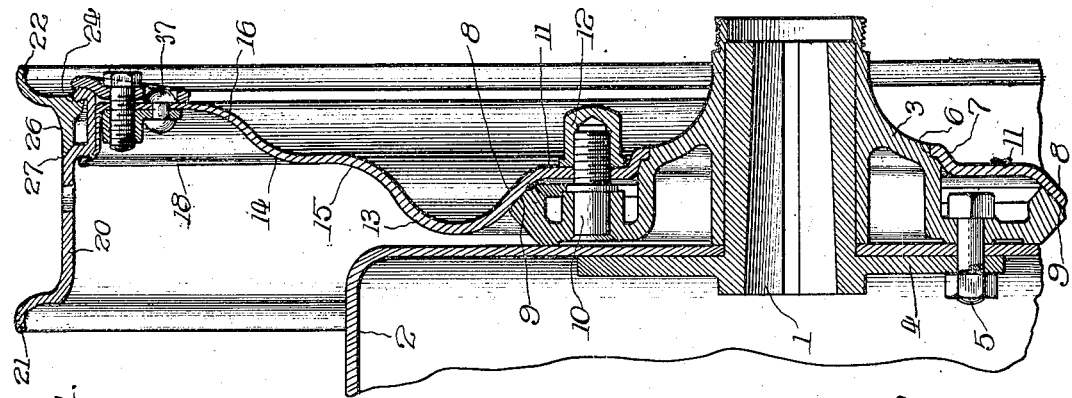
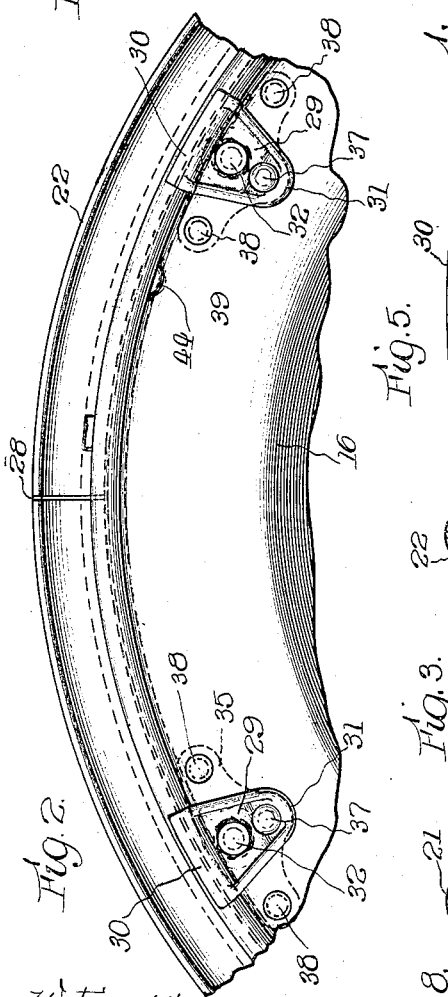
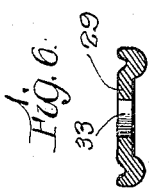
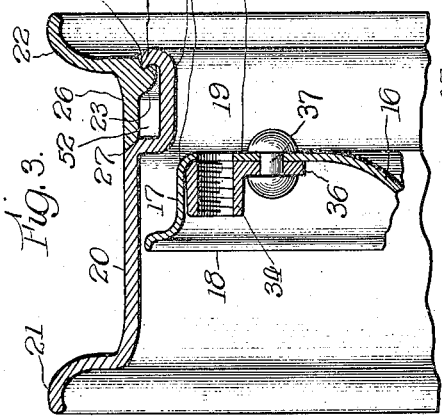
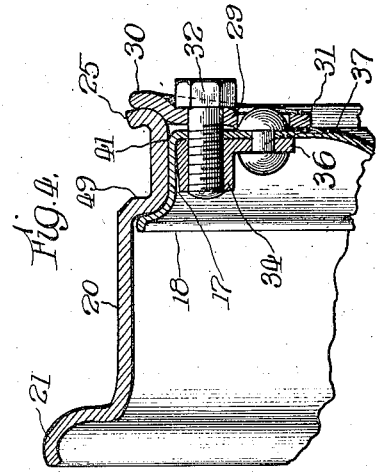
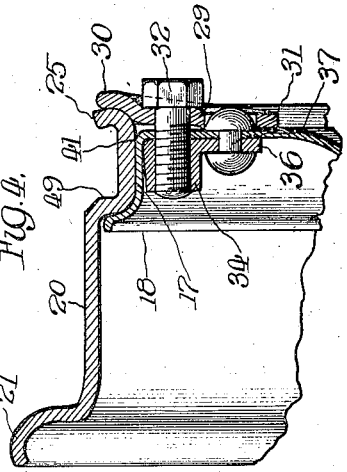
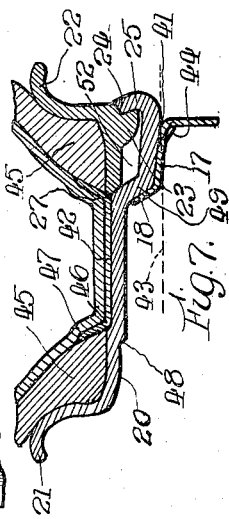
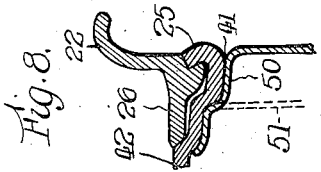

Patented Mar. 5, 1929.

1,704,524

UNITED STATES PATENT OFFICE.

WILLIAM ERASTUS WILLIAMS, OF CHICAGO, ILLINOIS, ASSIGNOR, BY MESNE ASSIGNMENTS, TO STEEL WHEEL CORPORATION, OF LANSING, MICHIGAN, A CORPORATION OF MICHIGAN.

DEMOUNTABLE-RIM WHEEL.

Application filed March 8, 1921. Serial No. 450,546.

My invention relates to wheels for automobiles wherein the rim is demountable from the web or wheel body for the purpose of making a change in tires or other analogous purposes.

The object of the invention is to furnish a very light, secure and inexpensive fastening that will have slight peripheral weight, will ensure concentric relation of the rim and wheel disk, and will provide a hub adapter usable with a wood hub in removably mounting thereon a steel disk type of wheel.

Reference will be had to the accompanying drawings in which Figure 1 is a diametrical section of the main portion of the wheel.

Figure 2 is a side elevation of a portion of the rim and wheel body.

Figure 3 shows the position of the rim and the wheel body in relation to each other at one stage of the mounting and demounting of the rim from the wheel body.

Figure 4 shows the main rim portion mounted on the wheel body but with the rim side ring absent or removed.

Figure 5 is a plan of one of the clips which holds the rim in place on the wheel body. Figure 6 is a section on line 6—6 of Figure 5.

Figure 7 is a section of a modified form of the rim. Figure 8 is a modified detail of the rim and disk where the side ring is located.

In the drawings 1 indicates the hub of a wheel of the ordinary wooden wheel type and 2 the brake drum as used with wheels generally and in this case applied in connection with a wooden wheel. 3 indicates my adapter which is secured to a flange 4 of the wooden wheel hub through the medium of bolts 5 and is provided with a seat 6 for the inner edge 7 of the wheel disk which is inclined at 8 and there rests on an inclined flange 9 of the adapter 3.

Studs 10 secured in the adapter flange, project through holes in the annular portion 11 of the disk and bear nuts 12 which demountably clamp the disk to the adapter. The disk is thick in its hub-zone and gradually decreases in thickness as the distance from the center increases, and its radial cross section shows a wavy outline due to depressions 13, 14 and swells 15, 16, whereby slight elasticity is secured. These swells and depressions also aid in the operation of pressing the disk into shape, since they allow clearance on the concave die faces and ensure drawing the metal smoothly over the corresponding convex portions, avoiding all buckling and wrinkling.

On the outer edge of the disk is formed a lateral flange 17, approximately perpendicular to the plane of the wheel and provided with an outwardly projecting terminal flange or lip 18, the flange and lip approximately fitting the portion 19 of the rim.

The main rim portion is provided with the tire tread seat 20 having a flange 21 and at its opposite margin a separate special locking ring 22 supported on an integral inwardly offset portion 19 provided with a narrow terminal locking flange 25. The locking ring so resting on an offset of the main rim has a rib 23 and shoulder 24 engaging the locking flange 25, and a part 26 of this ring joins at 27 the rim body and has its outer surface a continuation of the tire-receiving surface of the member 20.

The main rim body 20 is a continuous integral ring while the side ring 22 is cut asunder as indicated by 28 and when a tire is to be applied or removed the ring 22 is pried out from its seat in the main rim portion and removed, leaving a clear way to apply and remove the tire on to the main rim body as will readily be understood from Figure 4. The main rim body 20 with its side flange 21 is sufficiently rigid to carry safely any reasonable load, since the parts 17, 18 of the disk fit against and support the part 19.

The main rim body is secured to the wheel body in contact with the flanges as above described by any suitable means but I prefer to use a series of clips 29 provided with an outward lip 30 and an inward portion 31 bearing on the wheel body.

These clips are held in place and used as clamps to hold the rim on to the wheel body through the medium of a series of screws 32 passing through holes 33 in the clips or clamps and secured into fixed nuts 34 which are fastened to the wheel body by means of flanges 35 and 36 and rivets 37 and 38 which secure the nuts 34 permanently to the portion 39 of the wheel body or disk. The side rivets 38 are countersunk for smoothness on the outside of the disk or wheel body but the rivets 37 are button headed and enter into holes 40 of the clips 29 and thereby assist in holding said clips in working position.

On applying the rim to the disk or web or wheel body, the first position of relationship of the parts is indicated by Figure 3 and from that position the rim is pressed or pushed on to the flange 17 of the wheel body and after the same is engaged in frictional contact the clips 29 and screws 32 are applied in place and the rim is drawn tightly on to the disk by the screws 32.

When it is desired to remove the rim from the disk or demount the rim, the screws 32 are taken out and the clips 29 removed or revolved out of contact with the rim and then a screw driver is pressed into the joint 41 and used as a lever to force the rim loose from the seat 17 of the wheel body.

The width of the portion 19 and seat 17 is relatively narrow measured in terms of the width of the rim itself and on this account a rather close fit may be had of the rim on the flange 17 and yet permit the rim to be worked off from this flange with ease. The narrowness of this seat 19 and flange 17 allows slight swinging of the rim in attaching and detaching, while were there a wide seat with equally close fitting, the rim could not be conveniently mounted and dismounted in the manner set forth. The relatively narrow contact makes a practicable construction out of the forms I have shown when a wide one might not.

The modified form shown in Figure 7 has for its purpose to provide a shape of the rim that will permit a more easy removal and application of the tire to the rim and the rim itself to the disk or wheel body than the shape of those parts as shown in the other figures.

I accomplish this by making the central body portion 42 of the rim at the middle portion where the tire flap 46 or the tube 47 comes in contact with the rim, slightly offset inwardly from the portions of the seat formed on the ring 22 and on the opposite side of the main rim. Thus when the side ring 22 is removed the bead on that side is perfectly clear and free and on removal of the tire the bead at the left has only to be removed its width toward the right when there will be perfect freedom for its removal and the same is true on the application of the tire, as then the tire can be more easily applied.

In this Figure 7 the portion 19 of the rim and the flange 17 of the wheel body are made slightly inclined or wedge shaped and this is indicated by the horizontal dotted line 43 which shows the amount of this wedging inclination. Thus on the application of the rim to the wheel body or disk it goes on easily, up almost to the point of seating completely home when it is automatically tightly wedged fast.

The shape of my disk as shown permits a little elasticity, owing to the curved shape of the disk, and allows the wheel body of the disk to spring in and outward a little and make a tight fit of this flange 17 under the influence of the clamping devices before described, so that the elastic nature of the disk or wheel body aids in producing a secure connection between the parts.

While it is an easy matter to use a screw driver as already stated, at 41, to loosen the rim depressions 44 are provided at intervals to facilitate inserting the screw driver.

The portion 42 of the rim, which is made smaller in diameter than the main body portion 20 not only aids and gives clearance in the application and removal of the tire but also stiffens the rim, aiding in carrying the load strain transversely from one side of the rim to the part directly supported by the disk. Forming on the side ring a portion of the tire seat leaves the corresponding portion of the main rim member free for receiving any desired devices for joining the rim to the disk. Between the rim part 19 and the ring portion 26 a space is shown, it being provided to give a deeper shoulder 49 and greater stiffness to this side of the rim, but the space may be reduced to any desired extent. When the space is omitted, the construction of Fig. 8 may be employed, the disk directly supporting the outer part of the ring and being curved as indicated at 50.

What I claim is:—

1. In a device of the class described, a disk wheel body having a marginal flange turned on the edge thereof with a lip on the edge of said flange and the said marginal flange shaped with a slight conical incline; in combination with a demountable rim having a seat on the inside thereof adapted to seat on the flange of the said disk and said rim seat correspondingly inclined and adapted to wedge on to the flange on the margin of the disk and with means for clamping and holding the parts together.

2. In a device of the class described, a wheel body having a laterally extending marginal flange adapted to seat and hold a demountable rim; in combination with a demountable rim adapted to seat concentrically on the said marginal flange of said disk wheel body and said disk provided with a series of small indentations around the marginal seat flange for the entrance of a tool used in prying off the said demountable rim.

Signed at Chicago, in the county of Cook and State of Illinois, this 25th day of February, 1921.

WILLIAM ERASTUS WILLIAMS.